United States Patent [19]

Stauner et al.

[11] 3,958,050

[45] May 18, 1976

[54] PROCESS FOR CROSSLINKING HYDROPHILIC COLLOIDS

[75] Inventors: Thomas Stauner, Marly; Rainer Kitzing, Villars S. Glane; Remon Hagen, Marly; Carlo Boragine, Fribourg, all of Switzerland

[73] Assignee: Ciba-Geigy AG, Basel, Switzerland

[22] Filed: Apr. 10, 1974

[21] Appl. No.: 459,519

[30] Foreign Application Priority Data

Apr. 12, 1973 Switzerland.......................... 5224/73

[52] U.S. Cl.................................. 427/333; 96/111; 96/114.8; 427/407; 427/414; 427/415
[51] Int. Cl.² ............................................ B05D 3/10
[58] Field of Search ................ 117/62.1, 72, 34, 73, 117/62.2; 96/114.8, 111; 427/333, 407, 414, 415

[56] References Cited

UNITED STATES PATENTS

| | | | |
|---|---|---|---|
| 2,591,542 | 4/1952 | Harriman | 96/111 |
| 3,687,707 | 8/1972 | Graham | 96/111 |
| 3,792,021 | 2/1974 | Tschopp et al. | 96/111 |

*Primary Examiner*—Ronald H. Smith
*Assistant Examiner*—Janyce A. Bell
*Attorney, Agent, or Firm*—Joseph G. Kolodny; Edward McC. Roberts; Prabodh I. Almaula

[57] ABSTRACT

The present invention relates a process for crosslinking hydrophilic colloids, especially gelatine. The colloid is crosslinked with a water-soluble organic crosslinking agent which is allowed to act in a system consisting of at least two colloid layers. At least one layer contains the crosslinking agent and at least one layer which is free from crosslinking agents contains an aprotic solvent.

12 Claims, No Drawings

PROCESS FOR CROSSLINKING HYDROPHILIC COLLOIDS

The present invention relates to a process for crosslinking hydrophilic colloids, such as gelatine, by means of water-soluble crosslinking agents. It is known to bring insufficiently water-soluble crosslinking agents into solution and incorporate them into aqueous solutions of hydrophilic colloids by adding, as the solubilising agent, a water-miscible organic compound; the amounts of such an additive can vary greatly, corresponding to the solubility properties of the crosslinking agent in water and in the solubilising agent. In order to achieve the desired objective, the solubilising agent is used in relatively high amounts, and the crosslinking agent and solvent are from the start in one and the same layer if the manufacture of layer-form materials is concerned.

It has now been found that a favourable influence can be exerted on the action of the crosslinking agent by adding certain organic solvents in colloid layers which themselves do not contain a crosslinking agent. Accordingly, the subject of the invention is a process for crosslinking hydrophilic colloids which contain amino, imino and/or hydroxyl groups, by means of water-soluble organic crosslinking agents in the presence of water, characterised in that the crosslinking agent is allowed to act on the colloid in a system consisting of at least two layers of hydrophilic colloids, with at least one layer containing the crosslinking agent and at least one layer, which does not contain a crosslinking agent, containing an aprotic solvent.

Possible hydrophilic colloids to be crosslinked are, for example, polyvinyl alcohol, but especially gelatine and above all photographic gelatine layers.

The compounds to be used as crosslinking agents must be water-soluble, that is to say their solubility in water at 20°C must be at least 0.5 g of crosslinking agent in 100 g of water.

In other respects they can be selected as desired, for example from the large number of crosslinking agents already known. For example, suitable crosslinking agents are those which possess at least two identical or different substituents from those listed below: removable groups bonded to pyrimidine or triazine rings, such as halogen atoms, lower alkoxy groups, ammonium groups, immonium-ether groups and hydroxyl groups; aldehyde groups, including functionally modified aldehyde groups; epoxy groups; vinyl groups, preferably those bonded to —$SO_2$— or —CO— groups; groups which can be converted into vinyl groups; and aziridine groups. Crosslinking agents with aldehyde groups are described in "The Theory of the Photographic Process" by C. E. Kenneth Mees and T. H. James, page 56 to 57 [third edition], and also in DT-AS No. 2,133,402 and in U.S. patent application Ser. No. 335,604.

Crosslinking agents with vinyl groups or with groups convertible thereto are to be found in French Pat. Nos. 1,487,026, 1,485,104, 1,525,392, 1,524,588 and 2,101,943, in German Auslegeschriften Nos. 1,720,078, 1,693,159 and 1,793,501 and DT-OS No. 2,309,098.

Crosslinking agents of the azine type, especially those with removable groups bonded to pyrimidine or 1,3,5-triazine rings, have been disclosed, for example, in French Pat. Nos. 1,319,540 and 2,005,020 and in German Offenlegungsschriften Nos. 1,900,791, 2,215,720 and 2,248,623.

The compounds of the following formulae may be mentioned as typical examples of suitable crosslinking agents:

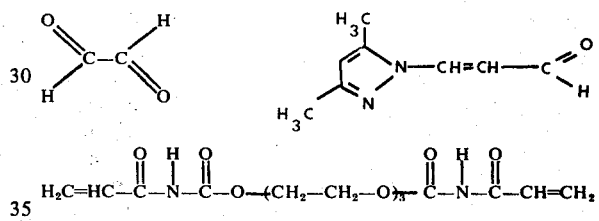

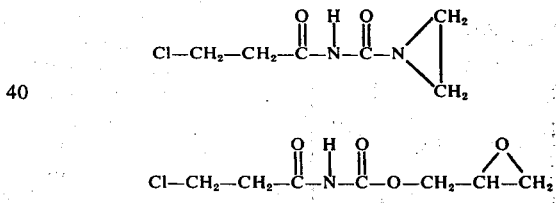

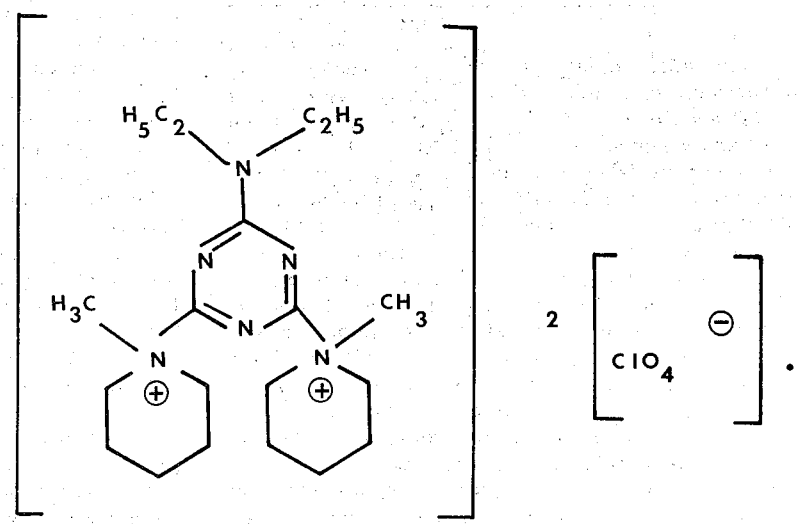

According to the invention, the crosslinking of the colloids is carried out in the presence of at least one aprotic solvent, preferably of an organic, non-basic, water-miscible compound, of which the boiling point under normal pressure lies in the range from 125° to 300°C. By aprotic solvents there are to be understood those which are incapable of donating protons to the reaction medium, whilst non-basic compounds are to be understood as compounds of which the $pK_a$-value is less than 3.

Preferred compounds are those of which the boiling point under normal pressure is at least 150°C (advantageously 160°C) and at most 250°C. The following compounds may be mentioned as examples:

| Formula | Boiling point |
|---|---|
| $\begin{array}{c} H \\ \diagdown \\ O \end{array} C-N \begin{array}{c} CH_3 \\ \diagup \\ \diagdown CH_3 \end{array}$ | 152°C |
| $\begin{array}{c} H_3C \\ \diagdown \\ O \end{array} C-N \begin{array}{c} CH_3 \\ \diagup \\ \diagdown CH_3 \end{array}$ | 165°C |
| $O=S \begin{array}{c} CH_3 \\ \diagup \\ \diagdown CH_3 \end{array}$ | 189°C |
| (N-methyl pyrrolidone structure) | ~202°C |
| $O=P(-N \begin{array}{c} CH_3 \\ \diagdown CH_3 \end{array})_3$ | 235°C |
| $O=C \begin{array}{c} N(CH_3)_2 \\ \diagdown N(CH_3)_2 \end{array}$ | 176°C |
| $\left[ O=P \left[ -O-CH_2-CH \begin{array}{c} CH_2 \\ \diagdown CH_2 \\ \diagup CH_2 \\ \diagdown O \end{array} \right] \right]_3$ | |

As mentioned initially, it is necessary, when building up the multi-layer material in the present process, to cast at least one layer which contains a crosslinking agent and which suitably is free from aprotic solvents, and at least one layer which contains an aprotic solvent but does not contain a crosslinking agent. The condition that at least one layer which does not contain a crosslinking agent should contain an aprotic solvent is to be understood to mean that when manufacturing the multi-layer material from an aqueous colloid which is free of crosslinking agent and contains an aprotic solvent, a layer is to be cast which is combined with a layer containing crosslinking agent. As a result of diffusion, especially of the aprotic solvent, from one layer into the other, and if appropriate also through colloid layers free from crosslinking agents and aprotic solvents, the aprotic solvent, however, rapidly comes into contact with the crosslinking agent, which results in a generally considerable acceleration of the crosslinking process.

The ratios with regard to hydrophilic colloid, aprotic solvent and crosslinking agent can vary within wide limits but are suitably chosen as follows: the amount of the aprotic solvent is 1 to 30%, preferably 1 to 20%, relative to the dry weight of all layers of colloid material, and the amount of the crosslinking agent is 0.2 to 10%, relative to the dry weight of all layers of colloid material.

As already indicated, there are numerous possible ways of building up the layers. In the simplest case, a carrier carries a layer containing an aprotic solvent and a layer containing crosslinking agent. One or other of these layers can be cast directly onto the carrier, as desired. In some cases it is advantageous if the layer containing the aprotic solvent is located underneath the layer containing the crosslinking agent. Further, a layer containing a crosslinking agent can be located between two layers with an aprotic solvent or a layer with aprotic solvent can be located between two layers with a crosslinking agent, or several, for example up to 10, layers with aprotic solvent and layers with a crosslinking agent can be positioned alternately. Layers without aprotic solvent and crosslinking agent can be incorporated in between.

The layers can be applied to the carrier successively or conjointly, for example by use of the so-called cascade coating process. It is frequently preferable that the layers containing crosslinking agents are applied simultaneously with, or later than, but not earlier than, the layers containing aprotic solvent, onto the layer carrier.

Of course, it is also possible to combine several crosslinking agents and/or aprotic solvents with one another if the conditions indicated are observed.

In the process of the invention, the hydrophilic colloids are crosslinked in the presence of water. It can be of advantage to add the crosslinking agent and/or the aprotic solvent in the form of a more or less concentrated aqueous solution to the colloid which is to be used to form a layer. This is advisable above all for the crosslinking agents since their amounts are generally relatively small and local high concentrations of crosslinking agent can have an adverse effect. In the present process, the reaction temperatures are suitably 10° to 80°C and preferably 20° to 60°C.

The reaction should essentially only take place after application of the layer, that is to say, for example, during the drying process. If this is not the case, the viscosity of the layer containing the crosslinking agent can under certain circumstances increase so greatly that the operating process is interfered with.

If the colloid layer is a gelatine layer it can contain silver halide and/or other materials for producing photographic images, for example colour coupling agents, developers, image dyestuffs and, if relevant, dye bleach catalysts for the silver dye bleach process, light filter dyestuffs, lubricants, antistatic agents, gelatine substitutes, for example in the form of a latex, wetting agents, UV absorbers, optical brighteners, sensitisers and stabilisers.

If the carrier having coated thereon the hydrophilic colloid layers are left at elevated temperature for some time, for example for up to 24 hours, or are stored at room temperature, hardening takes place rapidly and progressively. The melting point of the colloid is raised substantially and the reciprocal swelling factor increases correspondingly. The degree of hardening depends on the choice of the crosslinking agent, of the aprotic solvent and of the amounts of these additives. The advantage of the process is above all to be regarded as the fact that when the crosslinking agents and the aprotic solvents are used in the indicated manner the same degree of crosslinking is reached in a substantially shorter time than without the simultaneous use of the aprotic solvents. This makes it possible to test the coatings, by processing a sample, immediately following manufacture and drying.

In the examples which follow, the reciprocal swelling factor is used as a measure of the hardening. In other respects, the following remarks apply to the general procedure adopted in the examples: the gelatine double layers are cast by means of a laboratory casting machine onto a transparent triacetate base. Each layer is produced from a 5% strength gelatine solution and has a dry layer thickness of $7\mu$. The upper layer contains a small amount of a cyan dyestuff to facilitate measuring the swelling under the microscope. One layer contains the solvent and the other layer the hardener.

The dried samples are stored at 20°C and 50 to 60% relative atmospheric humidity. To measure the swelling, a thin section, $10\mu$ thick, is prepared and the thickness of the dry layer is then measured first, followed by the thickness of the layer which has been swollen with distilled water. The reciprocal swelling factor 1/SF corresponds to the following ratio:

$$1/SF = \frac{\text{Thickness of the dry layer}}{\text{Thickness of the swollen layer}}$$

EXAMPLE 1

The procedure described above is followed.
Lower layer with solvent: dimethylsulphoxide
Upper layer with crosslinking agent:

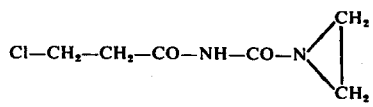

The table which follows gives the amounts of the products and the results of the measurement after two days' storage.

The amounts, in g/100 g of gelatine, relate to the two layers together.

| Solvent g/100 g of gelatine | Crosslinking agent g/100 g of gelatine | 1/SF | % Increase relative to blank sample |
|---|---|---|---|
| — | 1.24 | 0.149 | — |
| 25.0 | 1.24 | 0.214 | 44 |

EXAMPLE 2

The procedure indicated in Example 1 is followed.
However, the products tested are the following:
Lower layer with solvent: dimethylacetamide.
Upper layer with crosslinking agent: glyoxal.

The table which follows gives the amounts of the products and the results of the measurement after 2 days' storage.

| Solvent of g/100 g of gelatine | Crosslinking agent g/100 g of gelatine | 1/SF | % Increase relative to blank sample |
|---|---|---|---|
| — | 0.41 | 0.182 | — |
| 20.0 | 0.41 | 0.231 | 27 |

EXAMPLE 3

The procedure indicated in Example 1 is followed.
The products tested are the same; however, the lower layer, on the base, contains the crosslinking agent and the upper layer contains the solvent.

The table which follows gives the amounts of the products and the results of the measurement after 2 days' storage.

| Solvent of g/100 g of gelatine | Crosslinking agent g/100 g of gelatine | 1/SF | % Increase relative to blank sample |
|---|---|---|---|
| 1.24 | — | 0.145 | — |
| 1.24 | 25.0 | 0.187 | 29 |

EXAMPLE 4

The procedure indicated in Example 2 is followed.
The products tested are the same; however, the crosslinking agent is in the lower layer and the solvent in the upper layer.

The table which follows gives the amounts of the products and the results of the measurement after 3 hours' storage.

| Solvent g/100 g of gelatine | Crosslinking agent g/100 g of gelatine | 1/SF | % Increase relative to blank sample |
|---|---|---|---|
| 0.41 | — | 0.145 | — |
| 0.41 | 20.0 | 0.187 | 29 |

EXAMPLE 5

The procedure indicated in Example 1 is followed.
However, the following products are tested:
Lower layer with solvent: hexamethylphosphoric acid triamide.
Upper layer with crosslinking agent:

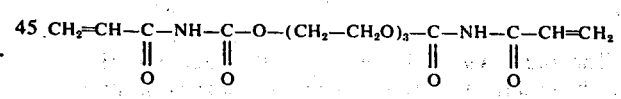

The table which follows gives the amounts of the products and the results of the measurement after 7 days' storage.

| Solvent g/100 g of gelatine | Crosslinking agent g/100 g of gelatine | 1/SF | % Increase relative to blank sample |
|---|---|---|---|
| — | 2.41 | 0.260 | — |
| 15.0 | 2.41 | 0.333 | 28 |

EXAMPLE 6

The procedure indicated in Example 1 is followed.
However, the following products are tested:
Lower layer with solvent: N-methylpyrrolidone.
Upper layer with crosslinking agent:

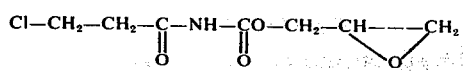

The table which follows gives the amounts of the products and the results of the measurement after 2 days' storage.

| Solvent g/100 g of gelatine | Crosslinking agent g/100 g of gelatine | 1/SF | % Increase relative to blank sample |
|---|---|---|---|
| — | 1.46 | 0.164 | — |
| 12.5 | 1.46 | 0.226 | 38 |

EXAMPLE 7

The procedure described in Example 1 is followed. However, the following products are tested:
Lower layer with solvent: tetramethylurea
Upper layer with crosslinking agent:

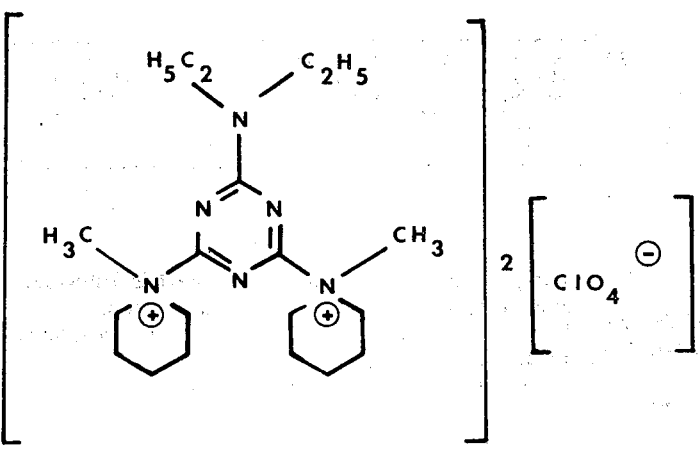

The table which follows gives the amounts of the products and the results of the measurement after 2 days' storage.

| Solvent g/100 g of gelatine | Crosslinking agent g/100 g of gelatine | 1/SF | % Increase relative to blank sample |
|---|---|---|---|
| — | 3.83 | 0.184 | — |
| 25.0 | 3.83 | 0.320 | 74 |

EXAMPLE 8

The procedure described in Example 1 is followed. However, the following products are tested:
Lower layer with solvent: dimethylformamide
Upper layer with crosslinking agent:

The table which follows gives the amounts of the products and the results of the measurement after 2 days' storage.

| Solvent g/100 g of gelatine | Crosslinking agent g/100 g of gelatine | 1/SF | % Increase relative to blank sample |
|---|---|---|---|
| — | 1.05 | 0.250 | — |
| 20.0 | 1.05 | 0.313 | 25 |

EXAMPLE 9

A copying material of the following build-up is produced by casting:
Protective layer
Emulsion layer dyed yellow, sensitive to blue
Intermediate layer
Emulsion layer dyed magenta, sensitive to green
Emulsion layer dyed cyan, sensitive to red
Cast base layer
Transparent substrate The same emulsion is used in all three light-sensitive layers. It is a silver bromide/iodide emulsion with 37 g of Ag/kg and with 76 g of gelatine/kg.

The cast base layer, the intermediate layer and the protective layer are gelatine layers.

The emulsion dyed cyan contains the image dyestuff of the formula

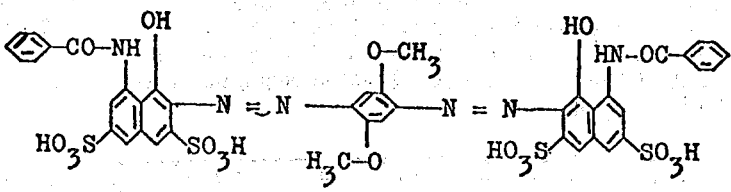

and a compound which produces sensitisation to red and has a sensitisation maximum of 650 nm.

The emulsion layer dyed magenta contains the image dyestuff of the formula

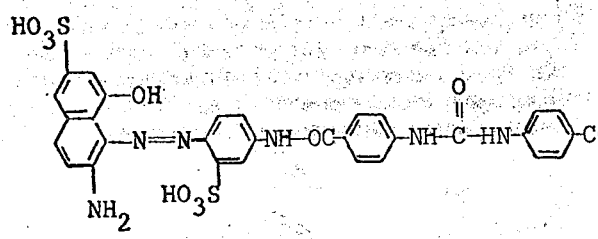
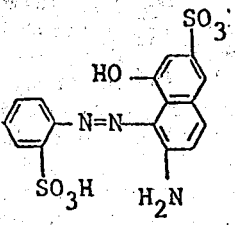

and a compound which produces sensitisation to green and has a sensitisation maximum of 550 nm.

The emulsion layer dyed yellow, which is sensitive to blue without addition of a sensitiser, contains the image dyestuff of the formula

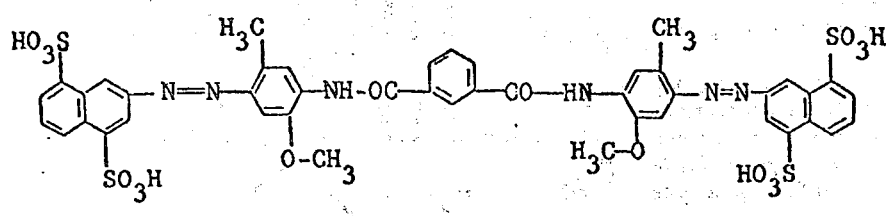

The cast base layer, the intermediate layer and the protective layer contain, as the crosslinking agent, the same concentration of the compound of the formula

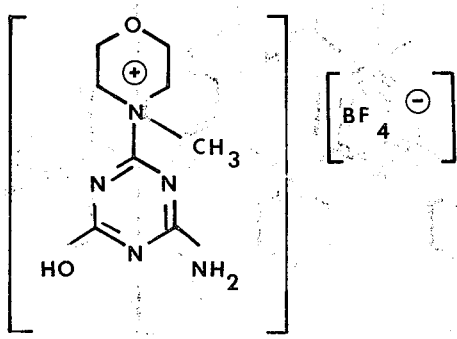

The amount of crosslinking agent, relative to all six layers, is 2.6 g/100 g of gelatine.

The cast base layer, the magenta layer and the yellow layer contain the compound of the formula

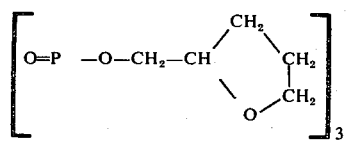

as the aprotic solvent. The amount of the solvent, relative to all six layers, is 9.9 g/100 g of gelatine.

Together with this casting B, a casting A is produced, which does not contain an aprotic solvent and serves for comparison.

The table which follows indicates the amounts of product in the comparative experiments carried out in the indicated manner, and the results of the measurement of the swelling after 3 weeks' storage.

| Casting | Solvent g/100 of gelatine | Crosslinking agent g/100 g of gelatine | 1/SF | % Increase relative to blank sample |
|---|---|---|---|---|
| A | — | 2.8 | 0.169 | — |
| B | 9.9 | 2.6 | 0.230 | +125 |

After processing by a silver dye bleach method, the castings A and B show the same sensitometric properties and a colour density of 2.4 density units.

We claim:

1. Process for crosslinking hydrophilic colloids present on a layer carrier which colloids contain amino, imino and/or hydroxyl groups, by means of water-soluble organic crosslinking agents in the presence of water, which process comprises allowing the crosslinking agent to act on the colloid in a system consisting of at least two layers of hydrophilic colloids, wherein at least one layer containing the crosslinking agent is free of aprotic solvent and at least one layer which does not contain a crosslinking agent, contains an aprotic, organic, nonbasic, water-miscible solvent, of which the boiling point under normal pressure lies in the range from 125° to 300°C.

2. Process according to claim 1, wherein the boiling point under normal pressure of the aprotic solvent lies in the range from 150° to 250°C.

3. Process according to claim 1 wherein the aprotic solvent is selected from the group consisting of the compounds of the formulae

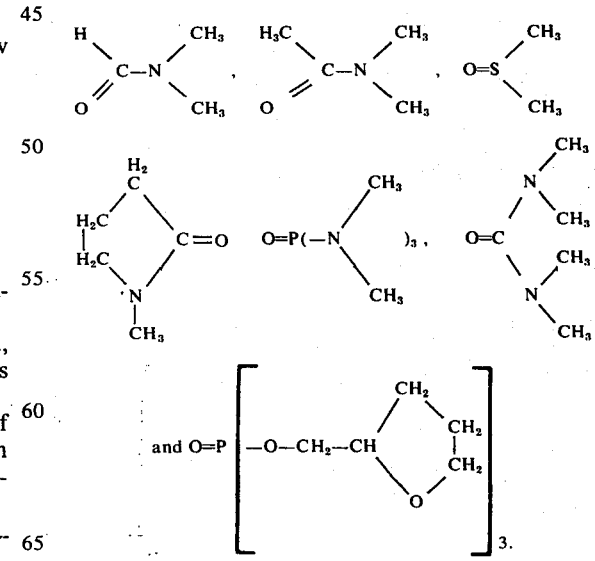

4. Process according to claim 1, wherein the boiling point under normal pressure of the aprotic solvent lies in the range from 160° to 250°C.

5. Process according to claim 1, wherein the amount of the aprotic solvent is 1 to 30% relative to the dry weight of all the layers of colloid material.

6. Process according to claim 1, wherein the layers containing the crosslinking agent are applied to the layer carrier simultaneously with or later than the layers containing the aprotic solvent.

7. Process according to claim 1, wherein the crosslinking agent is applied in an amount of 0.2 to 10% relative to the dry weight of all layers of colloid material.

8. Process according to claim 7, wherein the aprotic solvent is applied in an amount of 1 to 20% relative to the dry weight of all layers of colloid material.

9. Process according to claim 1, wherein the hydrophilic colloid layers are gelatin layers.

10. Process according to claim 9, wherein the gelatin layers are photographic material.

11. Process according to claim 1 wherein the crosslinking agent is an organic compound which contains at least two of the following reactive groups: removable groups bonded to pyrimidine or triazine rings; aldehyde groups, including functionally modified aldehyde groups; epoxy groups; vinyl groups, groups which can be converted into vinyl groups; and aziridine groups.

12. Process according to claim 11, wherein the crosslinking agent is a compound selected from the group consisting of the compounds of the formulae

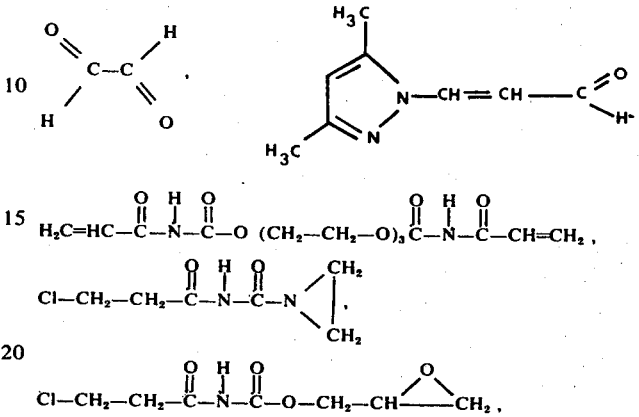

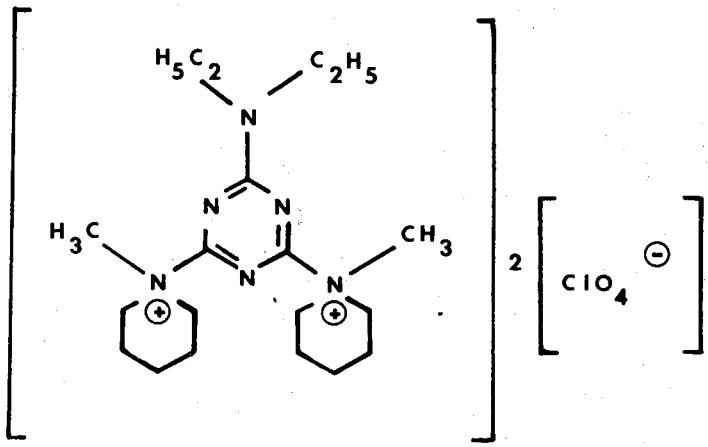

and